March 19, 1940.  M. P. LAURENT  2,193,971
PIPE COATING DEVICE
Filed Aug. 8, 1938  2 Sheets-Sheet 1

Inventor
Milton P. Laurent

By
Attorney

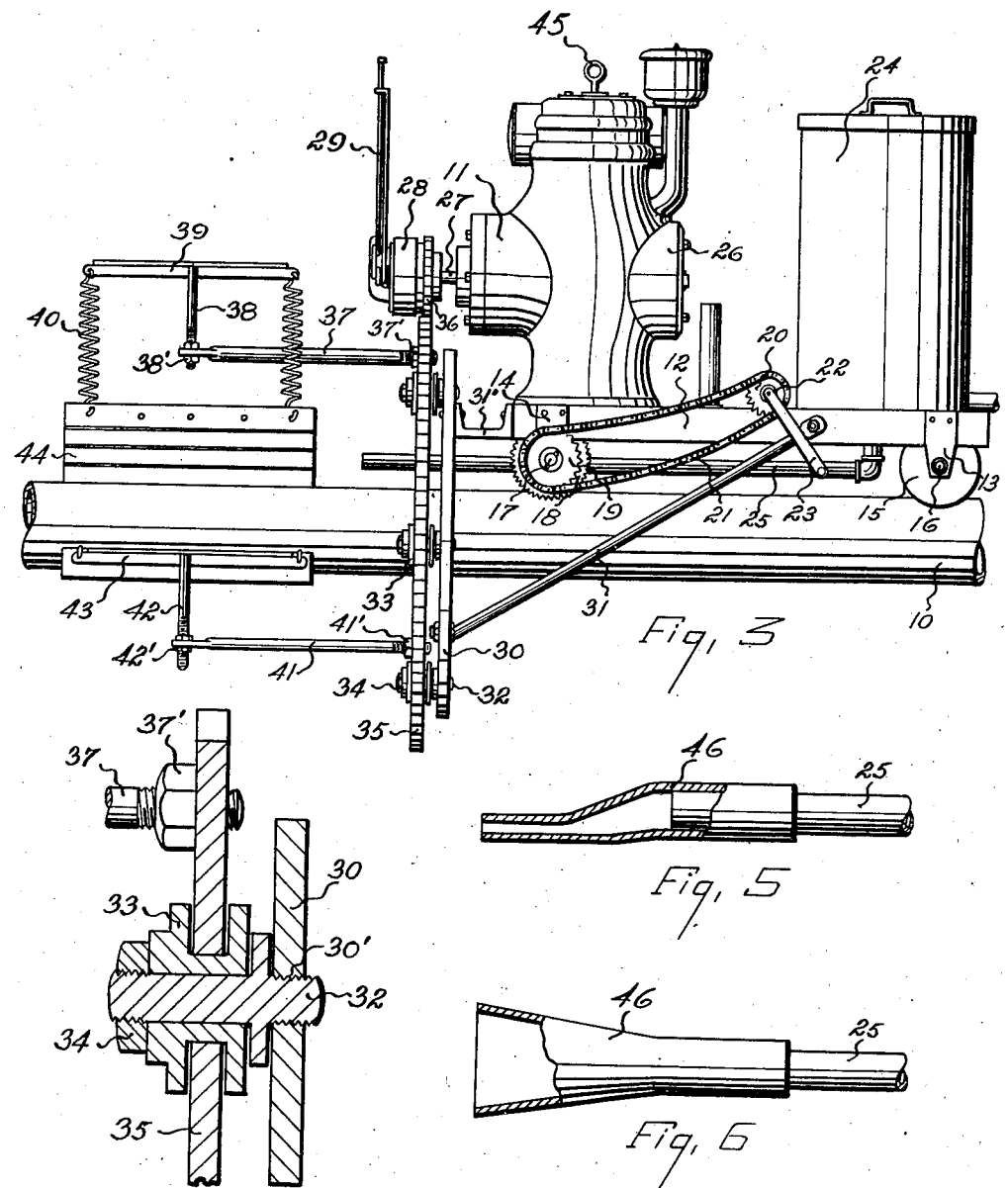

Patented Mar. 19, 1940

2,193,971

UNITED STATES PATENT OFFICE 2,193,971

PIPE COATING DEVICE

Milton P. Laurent, Houston, Tex., assignor to W. K. M. Company, Incorporated, Houston, Tex.

Application August 8, 1938, Serial No. 223,725

4 Claims. (Cl. 91—30)

This invention relates to new and useful improvements in pipe coating devices.

One object of the invention is to provide improved portable means for applying a coating material to pipes to prevent deterioration of said pipes due to corrosion, electrolysis and the like.

Another object of the invention is to provide an improved portable device for applying paint or other similar compositions to a pipe and having means for spreading said paint upon the pipe while the device is traveling along said pipe as a track, whereby the paint is evenly and smoothly distributed upon the surface thereof.

A particular object of the invention is to provide an improved portable pipe coating device which is adapted to be used on pipes of various diameters while the same are connected in a pipe line, whereby the device may be operated without interfering with the normal use of said pipe line.

An important object of the invention is to provide a device of the character described having flexible means for spreading a coating material upon a pipe as said material is fed thereto, the means being carried by a rotatable member encircling said pipe and holding said means in engagement therewith, whereby when the member is rotated said means is moved circumferentially of said pipe so as to evenly spread the coating material upon the entire external surface of the same.

A further object of the invention is to provide a portable pipe coating device of simple, sturdy construction which may be economically manufactured and which, if necessary, may be operated by one person.

A construction designed to carry out the invention will be hereinafter described, together with other features of the invention.

Figure 1:
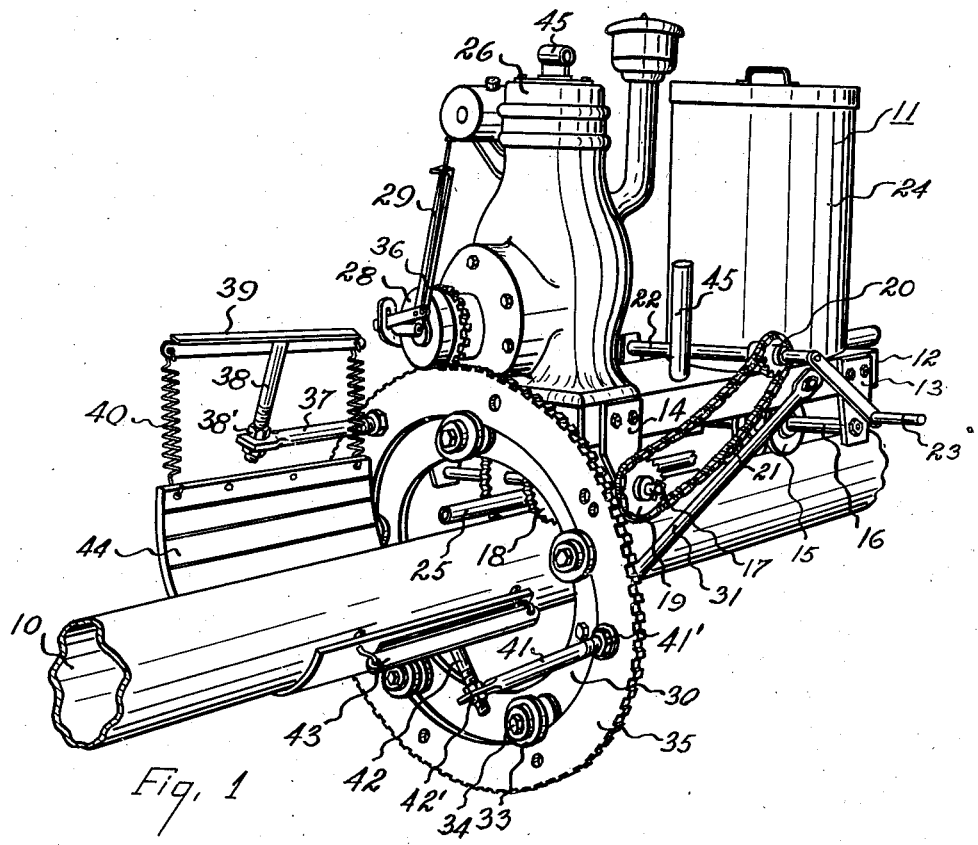
Figure 2:
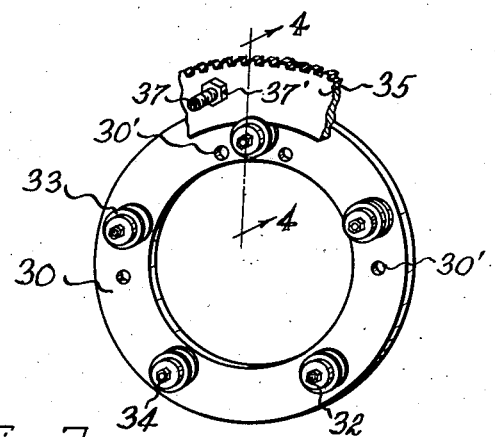

The invention will be more readily understood from a reading of the following specification and by reference to the accompanying drawings, in which an example of the invention is shown, and wherein:

Figure 1 is an isometric view of a pipe coating device constructed in accordance with the invention, Figure 2 is a reduced isometric view of the annular supporting member, having a portion of the ring gear mounted thereon, Figure 3 is a side elevation of the pipe coating device, Figure 4 is an enlarged vertical sectional view, taken on the line 4—4 of Figure 2, Figure 5 is a view, partly in section and partly in elevation, of a nozzle adapted to be mounted on the discharge tube, and Figure 6 is a similar view taken at the right angles to Figure 5.

In the drawings, the numeral 10 designates a portion of a pipe line upon which is mounted a pipe coating device 11. The pipe line serves as a track along which the device travels as the pipe is being coated or painted. The device is provided with a substantially rectangular support or frame 12 having a pair of alined depending ears or legs 13 formed on its forward end and a similar pair of rear legs 14. The forward end of the device is supported by a pair of wheels 15 mounted upon the mid-portion of an axle 16 which has its ends journaled within bearings (not shown) provided in the legs 13. An elongated axle 17, having a pair of toothed wheels 18 mounted intermediate its ends, extends through suitable bearings (not shown) in the rear legs 14 and projects beyond said legs. The wheels 15 and 18 are arranged to engage and ride upon the crown of the pipe 10 as shown in Figures 1 and 3, whereby the device 11 is supported thereon.

A sprocket wheel 19 is fastened upon one end of the axle 17 and is connected to a small sprocket wheel 20 by means of an endless sprocket chain 21. The sprocket wheel 20 is supported upon a transverse shaft 22 journaled to rotate in suitable bearings (not shown) carried by the frame 12 and having a suitable crank 23 secured to one of its ends. Upon turning the crank 23, the shaft 22 and sprocket wheel 20 are rotated which revolves the toothed wheel 19 since said wheel 20 has connection with said wheel 19 by means of the sprocket chain 21. Thus, the axle 17 and the wheels 18 are rotated by the crank 23, whereby the device may be propelled along the pipe 10.

A supply tank or container 24 is mounted upon the forward end of the frame 12 and is provided with a discharge tube 25 which extends longitudinally beneath the frame 12 and above the pipe 10 so as to terminate beyond the rear end of said frame. The tank 24 is adapted to hold a sufficient supply of any suitable paint, asphalt, grease or other material with which the pipe is to be coated, and said material is fed to the upper surface of the pipe 10 by the tube 25. A suitable motor 26 is supported upon the rear end of the frame 12 and is provided with a sectional drive shaft 27 which has its sections connected by a conventional clutch 28. The sections of the shaft 27 may be operatively connected and disconnected, whenever desired, by the clutch 28 which is actuated by a lever 29 in the usual manner.

An annular, supporting member 30 is disposed transversely behind and parallel to the rear end of the frame 12 so as to be in axial alinement with the pipe 10 extending therethrough. The member 30 is suitably secured to the frame by means of rods 31 and a bracket 31' and is provided with a plurality of longitudinal screw-threaded openings 30', spaced equi-distant apart. A plurality of stud shafts 32, having externally screw-threaded ends, are adapted to engage within the openings 30', whereby the shafts extend longitudinally from the rear or outer face of the member adjacent its inner end, whereby a dual-flanged roller 33 may be rotatably mounted upon said shaft and be confined thereupon between the flange and a suitable nut 34. An annular spur or ring gear 35, having a greater diameter than the member 30, has its inner periphery engaging the rollers 33, whereby the ring gear is rotatably supported by the shafts 32. The teeth of the ring gear are in constant mesh with a pinion or cog 36 carried by the outer section of the drive shaft 27, whereby said gear is rotated by the motor 26. Obviously, rotation of the gear may be controlled by the clutch 28 and lever 29.

A plurality of screw-threaded openings 35', spaced equi-distant apart, are disposed in the ring gear 35. A cylindrical rod 37, having a reduced screw-threaded inner end and a flattened outer end, is arranged to be received by one of the screw-threaded openings 35' and is held in tight engagement therewith by a nut 37' which is wedged against the rear or outer surface of the gear 35. The rod extends rearwardly and longitudinally from said gear, thereby being parallel to the pipe 10. A cylindrical upright arm 38, having its lower portion externally screw-threaded, engages within a screw-threaded opening formed in the flattened outer end of the rod 37 and is held in position by a pair of suitable nuts 38' which tightly engage opposite sides of the flattened end of said rod. Manifestly, the arm 38 may be adjusted by means of the nuts 38' due to its screw-threaded portion. A horizontal cross-bar 39, having a helical or coiled spring 40 depending from each end and being substantially T-shaped in cross-section, is centrally supported upon the upper end of the arm 38 and extends parallel to the rod 37.

A longitudinal rod 41, identical to the rod 37, has its screw-threaded end engaging within one of the openings 35' and is rigidly held in position by a similar nut 41'. A cylindrical arm 42, identical to the arm 38, is secured to the flattened outer end of the rod 41 by a pair of nuts 42', whereby the arm projects at right angles to said rod and supports a horizontal cross-bar 43. A flexible strip 44, of rug, carpet or other similar material, has one of its ends fastened to the lower ends of the helical springs 40 and its opposite end attached to the cross-bar 43, whereby the strip is supported longitudinally of the pipe 10. A portion of the strip 44 extends beneath the pipe so as to form an arcuate wiper therefor as shown in Figures 1 and 3. Since the strip is carried by the arms 38 and 42 rods 37 and 41, the latter being secured to the rotatable ring gear 35, it is obvious that said strip will revolve around the pipe when said gear is rotated by the pinion 36.

In operation, the device will be moved along the pipe by turning the crank 23 which rotates the rear axle 17 and toothed wheels 18 by means of the shaft 22, sprocket wheel 20, sprocket chain 21, and toothed wheel 19. As the device travels along the pipe, the coating material will be fed from the tank 24 to the upper surface of said pipe by the tube 25. It is noted that the end of the tube is spaced from the pipe so that the coating material is dropped thereonto in a continuous stream. The motor 26, which has been started, is then operatively connected to the shaft 27 by the clutch 28, whereby the pinion 36 carried by said shaft will turn and cause the ring gear 35 to rotate. The flexible strip 44, being supported by the gear will revolve around the pipe in snug engagement therewith, thereby picking up the coating material and distributing it evenly upon the entire surface of said pipe.

It is noted that a plurality of tubular brackets 45 may be provided at convenient points upon the device so that the same may be held in an upright position by means of elongate bars or similar members (not shown). In applying some types of coating materials to the pipe, it has been found desirable to feed the same directly to the surface of said pipe without dropping it thereon. For this purpose, a nozzle 46, having a flat head as shown in Figures 5 and 6, is arranged to be attached to the end of the tube 25 so that the coating material may be applied directly to the surface of the pipe. It is also pointed out that the flexible strip 44 may be adjusted to accommodate substantially any size of pipe by adjusting the screw-threaded arms 38 and 42 or by moving the rods 37 and 41 to another opening 35'.

Various changes, alterations and modifications may be made in the size, shape and arrangement of the herein described elements, within the scope of the appended claims.

What I claim and desire to secure by Letters Patent is:

1. In a pipe coating device, the combination of an elongate support having wheels for movably supporting it longitudinally of a pipe to be coated, an annular supporting member mounted on the rear of the said elongate support, a gear ring rotatably mounted on the annular member, means on the elongate support for revolving said ring, elements extending rearwardly from the gear ring, a flexible wiping strip having its ends suspended from said elements in rear of the elongate support and ring, and means carried by the elongate support for depositing a coating liquid on a pipe in the path of said wiping strip.

2. A pipe coating device as set forth in claim 1 and yieldable means connecting the flexible wiping strip to the ring whereby said wiping strip will remain in contact with the surface of the pipe at all times.

3. A pipe coating device as set forth in claim 1 and means mounted on the elongated support for moving said device along a pipe which is to be coated.

4. In a pipe coating device, the combination of an elongate support having wheels for movably supporting it longitudinally of a pipe to be coated, a container located forwardly on said support, a non-rotatable annular supporting member mounted on the rear of said elongated support, a gear ring rotatably mounted on the annular member, a motor mounted on the elongate support having gear meshing with said ring gear for revolving the same, elements extending outwardly from the gear ring, a flexible wiping strip in rear of the elongated support and having its ends suspended from said elements and one end suspended by resilient means whereby said strip is urged upwardly against the pipe, and means carried by the elongated support for depositing a coating liquid on a pipe in the path of said wiping strip.

MILTON P. LAURENT.